(12) United States Patent
Kenny

(10) Patent No.: US 6,393,506 B1
(45) Date of Patent: May 21, 2002

(54) VIRTUAL CHANNEL BUS AND SYSTEM ARCHITECTURE

(75) Inventor: John D. Kenny, Fremont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/334,144

(22) Filed: Jun. 15, 1999

Related U.S. Application Data

(63) Continuation of application No. 09/057,716, filed on Apr. 9, 1998.
(60) Provisional application No. 60/073,565, filed on Feb. 3, 1998.

(51) Int. Cl.[7] .......................... G06F 13/362; G06F 13/40
(52) U.S. Cl. .......................... 710/113; 710/107; 710/305
(58) Field of Search ............................... 710/107–125, 710/305

(56) References Cited

U.S. PATENT DOCUMENTS

| | | | |
|---|---|---|---|
| 5,212,795 A | 5/1993 | Hendry | 395/725 |
| 5,463,629 A | * 10/1995 | Ko | 370/463 |
| 5,475,860 A | 12/1995 | Ellison et al. | 395/846 |
| 5,490,253 A | * 2/1996 | Laha et al. | 710/124 |
| 5,526,349 A | * 6/1996 | Diaz et al. | 370/392 |
| 5,563,885 A | 10/1996 | Witchey | 370/94.2 |

OTHER PUBLICATIONS

Hennessy, John; Patterson, David, "Computer Organization and Design, the Hardware/Software Interface", Second EditionMorgan Kaufman Publishers, Inc., San Francisco, CA, pp 667, 669, 670.

Turley, Jim, "SA–1100 Puts PDA on a Chip", Microprocessor Report, vol. 11, No. 12, Sep. 15, 1997, pp. 1, 6–8.

* cited by examiner

*Primary Examiner*—Sumati Lefkowitz
(74) *Attorney, Agent, or Firm*—Skjerven Morrill MacPherson LLP; Edward C. Kwok

(57) ABSTRACT

A processor system includes an on-chip, split-transaction bus with independent address/control and data buses. Arbitration and bus acquisition protocols are performed on the address/control bus. An arbiter arbitrates I/O requests and regulates concurrent ownership of the split-transaction bus by assigning a virtual channel to each bus request. Data bus access is granted to a virtual channel on a priority basis, s so as to utilize to a maximum extent the available bandwidth of the data bus. In one embodiment, the data bus is preempted by another virtual channel when current virtual channel using the data bus becomes idle due to, for example, latencies in the data stream. Rearbitration, however, is avoided when the interrupted data transfer resumes, owing to state information regarding the data transfer stored in the master and slave modules of each virtual channel.

12 Claims, 10 Drawing Sheets

VIRTUAL CHANNEL BUS AND SYSTEM ARCHITECTURE

This appln is a con't of Ser. No. 09/057716 filed Apr. 9, 1998 and claims benefit of Prov. No. 60/073,565 filed Feb. 3, 1998.

BACKGROUND

1. Field of the Invention

This invention relates to digital data communication, and more particularly to a system and method for coordinating the transfer of digital data between functional modules in a computer system.

2. Description of the Related Art

In an advanced multimedia PC system, the system memory is a central resource. Unlike PC systems of a previous generation, which are typically designed around the central processing unit (CPU), the memory system in such an advanced multimedia system is much more heavily utilized than before. Typically, the various blocks or subsystems of the system share a communication link, or bus, for exchanging data. However, at higher processing speeds and system complexities, data transfer between subsystems (e.g., I/O devices) or between a subsystem and the main memory remains a performance bottleneck. Maximizing bus speed to accommodate the demands of higher processing speeds and interconnecting large numbers of I/O devices require higher bus availability and bandwidth. A fast response time for I/O operations can be achieved by minimizing bus access time through streamlining the communication path. The bus bandwidth can be increased using buffering and by transferring larger units of data, at the expense of latency. However, bus speed improvement is not straight-forward, since modules of a multimedia system typically include subsystems of widely varying latencies and data transfer rates.

One method for increasing the effective bus bandwidth shared by multiple devices utilizes a split transaction bus, which is released by a subsystem as soon as possible, even when only a portion of a transaction is complete. In a split transaction bus, however, the bus is released to allow use by another requester. However, once the bus is released, additional transactional overhead is incurred by the bus master to re-acquire the bus. For example, in a split transaction protocol, to resume an interrupted bus transaction, a memory system is required to signal the requester to indicate readiness. Thus, in such a system, additional transaction overhead is required to communicate the requester's identity to the memory system. Also, a split transaction protocol is typically more expensive to implement, primarily because of the need to keep track of the parties of a bus transaction.

One improvement of bus access provides additional bus masters into the system. A master module initiates and controls all bus requests. In a system having a single bus master (e.g., a processor bus is typically controlled by a CPU), all requests are initiated and controlled by the single bus master, thus requiring involvement by the bus master in every bus transaction. The overhead cost thus incurred can be substantial. For example, a single sector read from a disk may require the processor to intervene many times.

Faster and higher bandwidth subsystems cannot require the processor to intervene every bus transaction. Thus, an alternative architectural scheme using multiple bus masters is developed. With multiple bus masters, a bus arbiter is necessary. In a bus arbitration scheme, an I/O device signals a bus request and carries out a bus transaction only when the bus request is granted. One problem with a such a scheme results from the arbiter becoming a bottleneck for bus usage. In particular, where an arbiter receives multiple request lines, the transactional overhead in choosing among independent devices requesting bus access and notifying the selected device create delays.

Accordingly, there is a need for a bus system and architecture by which both bus access and effective bus bandwidth are enhanced. There is also a need for a bus arbitration scheme that increases the effective bandwidth of a bus without incurring additional latencies resulting from additional transactional overhead of a bus arbitration scheme and the possibility of the bus arbiter becoming the I/O roadblock. There is also a need for a bus architecture that provides enhanced bus access to I/O devices without incurring additional arbitration-related latencies.

SUMMARY OF THE INVENTION

This invention provides a memory-centric, modularized single-chip processor system, and includes an on-chip split-transaction bus with independent address and data lines. A centralized bus arbiter module uses REQ/GNT protocols to independently arbitrate concurrent ownership of a data bus. Multiple concurrent "virtual" channels are defined by the arbiter, each virtual channel being owned by a master-slave pair. Concurrent ownership by multiple master/slave pairs results in high utilization of a single bus, and eliminates re-arbitration delays.

The inter-module digital signal communication system of this invention includes a bus having separate data lines and address lines. Also, the handshaking transactions among the master, slave, and arbiter to determine bus ownership are de-coupled from data transfer operations on the data bus, thus allowing any access delays over the address lines to overlap with data transfer operations, resulting in high utilization of the available data bus bandwidth. Both the address bus and the data bus may be any width. In one embodiment, the address bus is 32 bits wide, and the data bus either 64 bits or 128 bits wide.

In another embodiment, multiple data buses may be employed. In a memory system which supports burst access, the present invention reduces the number of master/slave handshaking transactions. Accordingly, the architecture of this invention is scaleable to accommodate multiple data buses of any width.

Modules connected to the bus include adaptable interface logic circuits and drivers. These interface circuits permit both on-chip and external modules (i.e., off-chip modules) to utilize the virtual channel capabilities of the architecture of the system of this invention. The logic circuits in a master or slave module recognize and store their virtual channel assignments, and enable the corresponding interface drivers when data transfer access to the bus is granted to the assigned virtual channel.

In accordance with one aspect of the system of this invention, a bus arbiter assigns a virtual channel to each master/slave pair requesting the data bus for data transfer between the master module and a slave module. Each virtual channel represents a timeslice on the bus and is owned by a separate master/slave pair, thereby permitting multiple master/slave pairs to have concurrent ownership of the singular data bus.

Once the bus arbiter grants data access of the bus to a virtual channel, the arbiter asserts a "channel active" signal to initiate actual data transfers between the master/slave pair assigned to that virtual channel. The arbiter multiplexes between virtual channels based on the readiness of master/slave pairs and on the pre-assigned priority of each master.

Concurrent ownership of the data bus by multiple master/slave pairs advantageously enhances bus accessibility over conventional split-transaction bus protocols since the transactional overhead associated with bus re-acquisition protocols between a master/slave pair is eliminated. Since each channel, hence each master/slave pair, has its own unique channel active signal, data transfer between the master/slave pair commences immediately upon the arbiter asserting the appropriate "channel active" signal. Initial acquisition, or re-acquisition of the data bus is accomplished without the handshaking protocols associated with a conventional split transaction bus each time the data bus is acquired. As a result, the virtual channel architecture of this invention permits virtually simultaneous parallel transfers on a single data bus, or on multiple data buses, and allows for maximum bus accessibility and bandwidth utilization of the memory resource.

In accordance with another aspect of the device of this invention, various priority protocols may be used to determine which concurrent owner is granted access to the bus. Concurrent data transfers and maximum utilization of available data bus bandwidth is realized by timeslicing the data bus into multiple virtual channels according to a priority multiplexing scheme. Types of priority schemes that may be utilized include preemptive priority, simple priority, fixed priorities, and dynamically allocated, or stochastic, priorities. In one embodiment, a preemptive priority scheme is used which interrupts data transfer in a lower priority channel when a "channel ready" signal is asserted by a party of a virtual channel having a higher priority. The current transfer is preempted and data transfer between the higher priority master/slave pair commences. The preempted master/slave pair continues to assert a channel ready signal indicating it is ready and able to access the data bus. If during the data transfer a latency occurs by which the higher priority master/salve pair de-asserts its channel ready signal, the arbiter selects the next highest priority virtual channel awaiting processing, and begins data transfer in that channel. However, under a preemptive priority scheme, as soon as the higher priority channel asserts a ready signal, the lower priority channel is again preempted and forced to wait until the higher priority data transfer is completed.

Preemptive priority, discussed above, results in the arbiter immediately granting a virtual channel immediate access to the data bus, when the virtual channel has the highest priority amongst the remaining virtual channels. In a simple priority scheme, a virtual channel having a higher priority than another virtual channel currently being processed will wait until the currently processed virtual channel deasserts its ready signal, whereupon the higher priority channel is immediately serviced.

In a fixed priority scheme which may be used in combination with either the preemptive or conditional priority types, each I/O module is assigned a fixed priority. By comparison, a dynamic allocation priority scheme shifts priorities among the various I/O modules according to a predetermined or pre-defined protocol. For example, a statistical weighting priority scheme may assign a higher priority to those I/O modules consistently requesting the largest amount of data or requesting data more frequently. Priority is dynamically allocated to those modules as these weightings change over time.

In another embodiment, a particular I/O module may be given high priority for a predetermined or pre-defined quantity (a "cap") of data transferred, thereafter having a lower priority assigned to it after the module has exhausted its cap. This scheme allows precise and flexible allocation of the available bandwidth among various bus masters. For example, the graphics processor may be assigned a high priority virtual channel, but be limited to only an 8 megabyte data transfer per access in order to update and refresh the graphics display. After the 8 megabyte data transfer, however, the priority assigned-to the graphics output module may thereafter be reduced.

The concurrent data transfer capability of the architecture of this invention is enabled by essentially eliminating re-arbitration delays between multiple virtual channels. The protocol for acquiring a virtual channel is typically a one-time overhead. Address counters in the logic interface of each module keep track of the data transferred in the virtual channel and eliminate re-access handshaking in the event a data transfer is interrupted.

Moreover, a preemptive priority multiplexing scheme of the architecture of this invention minimizes latency to critical agents such as the CPU, by providing it top priority, or by increasing the likelihood that it will find the data bus immediately available since there are multiple channels available. In one embodiment, availability of the data bus to the CPU may be ensured by dedicating one virtual channel exclusively to the CPU.

In accordance with another aspect of the virtual channel architecture of this invention, multiple read and write buffers are provided at the memory controller interface to the split-transaction bus. The read and write buffers are positioned between the data and address buses and the memory controller. A dedicated read buffer for each virtual channel in the main memory interface permits prefetching data from main memory for a current request during the latency, as the corresponding master awaits access to the data bus, and permits storing the prefetched data in the buffer assigned to the virtual channel. Once the arbiter asserts as active the virtual channel assigned to that master, at least a portion of the requested data by that master is made immediately available for transfer via the read buffer. This effectively eliminates the inefficiencies normally associated with retrieving data directly from main memory.

By providing a set of read buffers pre-assigned to data bus virtual channels, performance (i.e., utilization of available bandwidth) of the virtual channel architecture of this invention is further enhanced. The number of read/write channels and the depth of each channel depends upon the characteristics of the agents in the system and the system applications. Additionally, by providing buffers in the memory controller interface, parallel transfers between two non-memory agents are allowed contemporaneous with the memory itself being fully utilized.

Once data transfer in a virtual channel is complete, the data source acknowledges completion of data transfer and relinquishes the virtual channel for use by other subsystems.

BRIEF DESCRIPTION OF THE DRAWINGS

The present invention is better understood, and its numerous objects, features, and-advantages made apparent to those skilled in the art by reference to the accompanying drawings.

Use of the same reference symbols in different drawings indicates similar or identical elements.

DETAILED DESCRIPTION OF THE PREFERRED EMBODIMENT(S)

Figure 1:
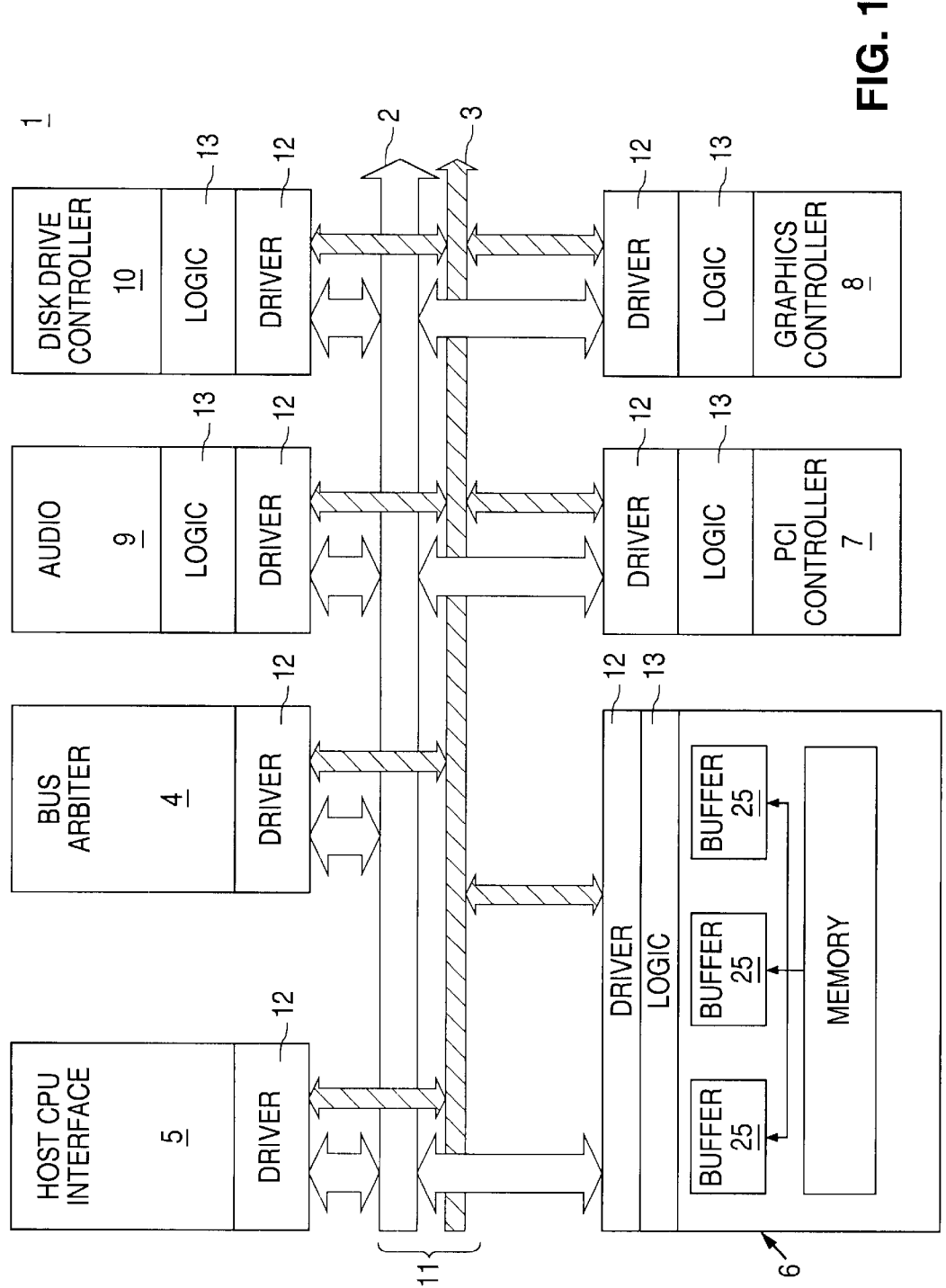
FIG. 1 is a block diagram showing a split-transaction bus, in accordance with one embodiment of the present invention, including a bus arbiter for a virtual channel system.

FIG. 1 shows a system 1 implementing the virtual channel split-transaction bus, in accordance with an embodiment of the present invention. As shown in FIG. 1, a split-transaction bus 11 includes a data bus 2 and an address bus 3, a bus arbiter 4, a host central processor unit (CPU) interface controller 5, a main memory 6, and functional modules including, for example, a PCI bus controller 7, a graphics controller 8, an audio module 9, and a disk drive controller 10. Memory unit 6 includes one or more buffers 25. Buffers 25 are used to prefetch data from memory, or to write data to memory. Address bus 3 specifies not only memory addresses but various control signals also, as discussed in further detail below.

Figure 2:
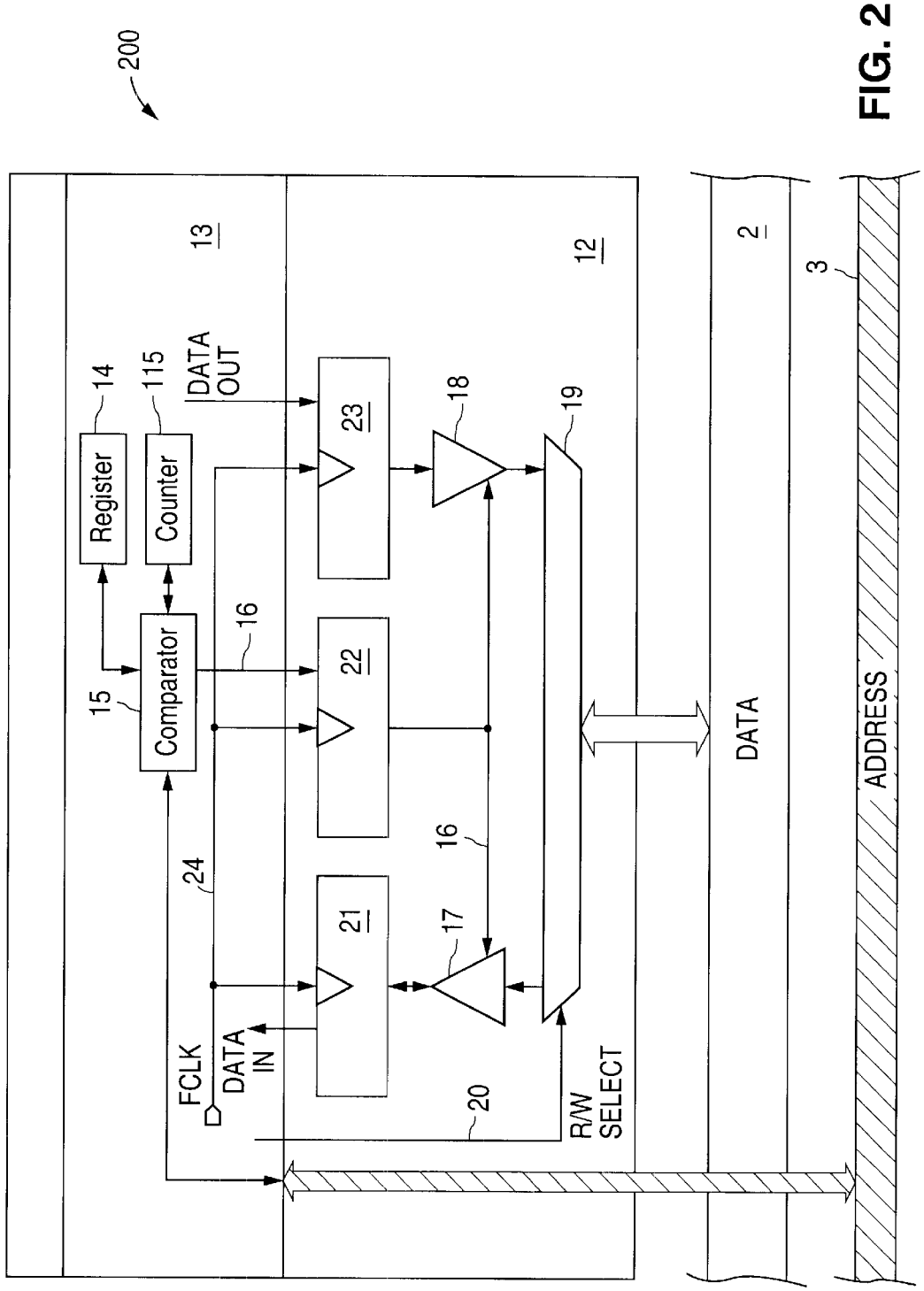
FIG. 2 is a block diagram showing a module interface circuit of the present invention.

Each module interfaces with split-transaction bus 11 using an interface controller, which includes a physical or driver layer 12, and a logic layer 13. Such a module interface is exemplified by module interface 200 of FIG. 2. As shown in FIG. 2, logic layer 13 receives transactional and other control signals over address bus 3. In one embodiment, logic layer 13 includes a register 14 for storing virtual channel control information, an address counter 115 which tracks the address of each unit of data transferred and increments the counter for each unit of data transferred, and a comparator circuit 15 for detecting a grant by arbiter 4 to data bus 2. If arbiter 4 asserts a channel active signal which corresponds to the virtual channel control information stored in register 14, comparator circuit 15 generates a digital signal on either enable line 16 to enable buffer 17 to read data from the data bus or to enable buffer circuit 18 to write data to data bus 2.

Virtual channel control information (e.g., the addresses of the master/slave pair, their priority, and their virtual channel assignment) can be stored in a register in bus arbiter 4. Thus, bus arbiter 4 can signal grant of the data bus by either asserting a dedicated "channel active" control signal for a given virtual channel, or providing identity bits of a virtual channel in dedicated bits of address bus 2.

Driver layer 12 includes switch 19, which selects between read mode and write mode, according to the logic value of a selection signal on line 20. Registers 21, 22, and 23 latch read, address and write data, respectively. A master chip clock FCLK (not shown), is received at terminal 24 to synchronize registers 21, 22 and 23 with timing on split-transaction bus 11.

Address counter 115 is included in logic circuit 13 of each master module and slave module. During data transfer, the address counters 115 in both the master and slave modules are incremented at each clock cycle to provide the address of the block of data to be transferred during the next clock cycle. As a result, both the master module and the slave module independently track data transfer. When the data transfer is interrupted (e.g., the presently active virtual channel being preempted by another virtual channel associated with a higher priority) both the master module and the slave module retain the address of the next unit of data to be transferred in the address register, thereby preserving the state of the data transfer before the preemption. Accordingly, upon re-acquiring split-transaction bus 11, i.e., upon bus arbiter 4 next granting the virtual channel access to split-transaction bus 11, the virtual channel may immediate resumes data transfer without additional handshaking overhead.

Figure 3:
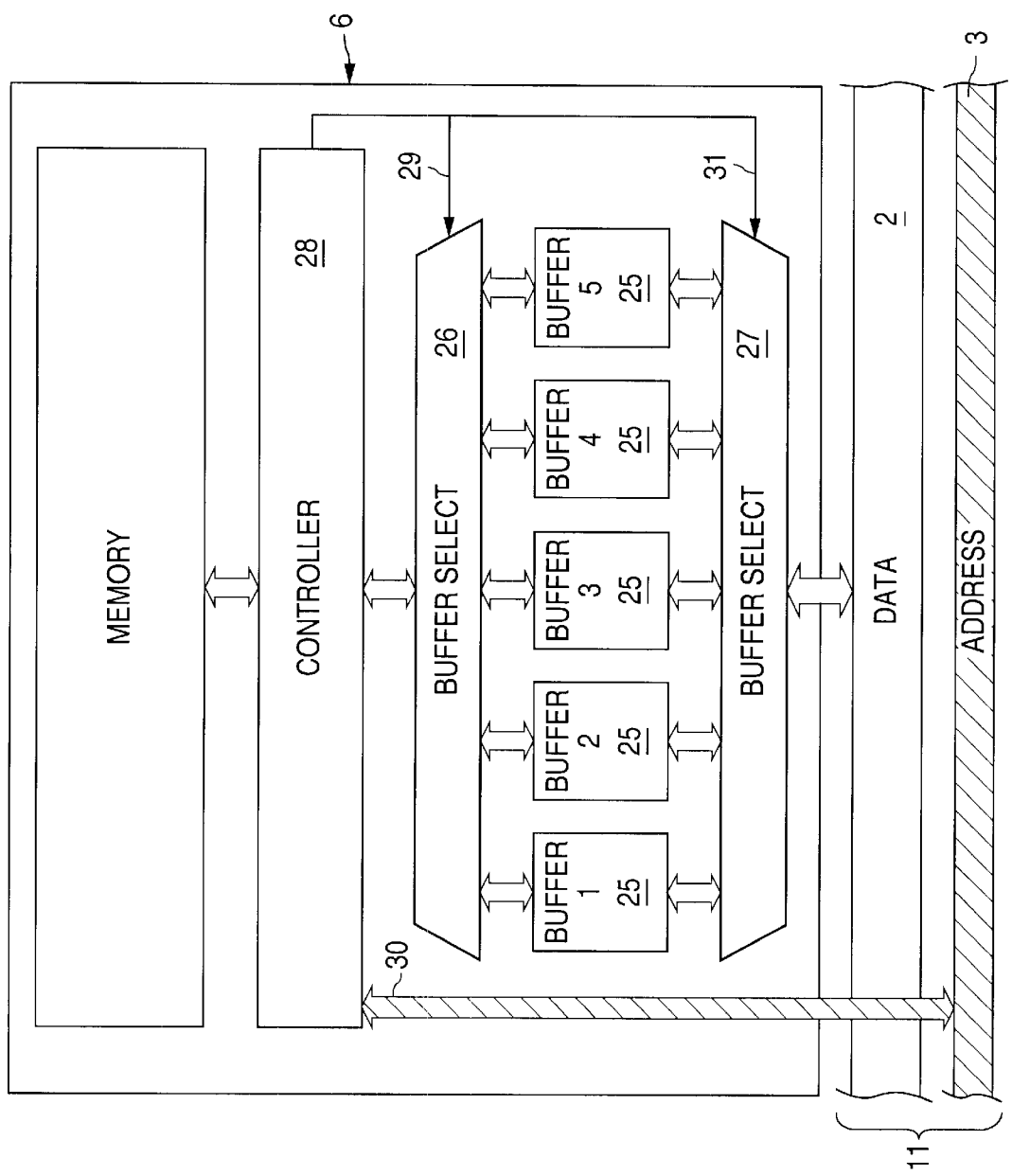
FIG. 3 is a block diagram of a multi-buffered memory for prefetching data, in accordance with one embodiment of the present invention.

FIG. 3 shows in further detail memory unit 6, including read and write buffers 25. Selection switches 26 and 27 select the appropriate buffer using control information received from address bus 3 (lines 30, specifically) into memory controller 28. The digital selection signal is provided to switches 26 and 27 over lines 29 and 31 respectively.

Each of buffers 25 can be pre-assigned a virtual channel and a priority. Alternatively, the virtual channel and the priority can each be assigned at run-time at the time access to split-transaction bus 11 is requested by a master module, and the memory (always a slave) acknowledges grant of the bus. Regardless of whether or not priority is preassigned, the number of virtual channels available for assignment can exceed the number of buffer channels 25 within memory controller interface thereby enabling parallel transfers between two non-memory agents simultaneously to fully utilized the memory bandwidth.

Figure 4:
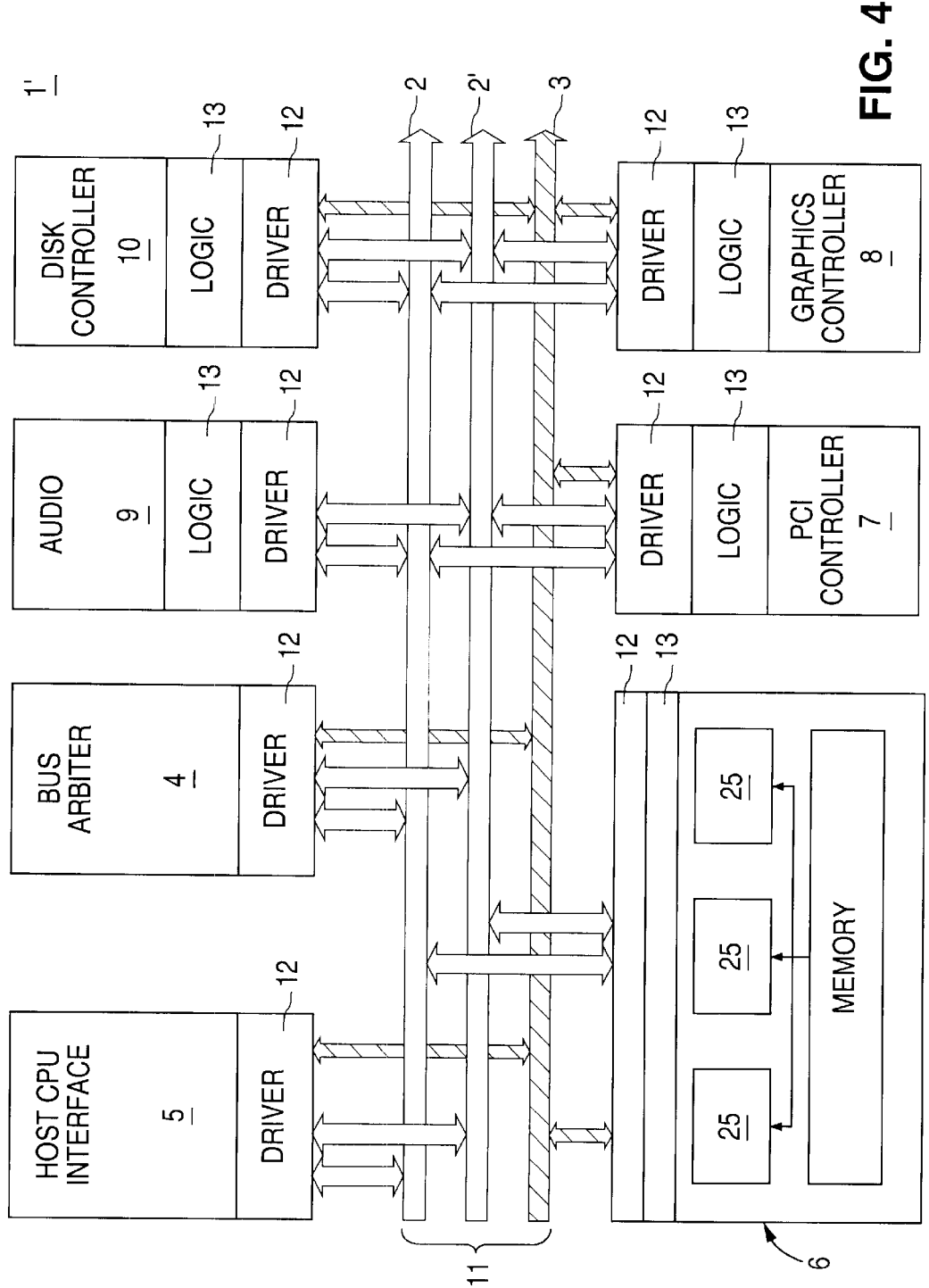
FIG. 4 shows another embodiment of the present invention, showing a split-transaction bus including multiple data buses, and a bus arbiter.

FIG. 4 is a block diagram of another embodiment of a virtual channel split-transaction bus architecture 1' using data buses 2 and 2'. Since data may be burst on data buses 2 and 2', address bus 3 is less frequently accessed than data buses 2 and 2'. Split-transaction bus 11 of this invention permits adding additional data buses to provide a large data bandwidth. Modifications to bus interface layers 12 and 13 and to arbiter 4 to accommodate multiple data buses 2 and 2' are required to allow multiple data buses. For example, arbiter 4 assigns and stores a data bus address in each module's virtual channel control information register and virtual channel designation, when the virtual channel is assigned.

Split-transaction bus 11 permits preemption by another virtual channel during a periods of latency. The present invention provides a simplified bus access method which avoids the typical re-arbitration protocols. Unlike split-transaction buses of the prior art, which have only a single owner at any point in time, the virtual channel inter-module exchange system of this invention permits concurrent ownership by multiple virtual channels.

Figure 5:
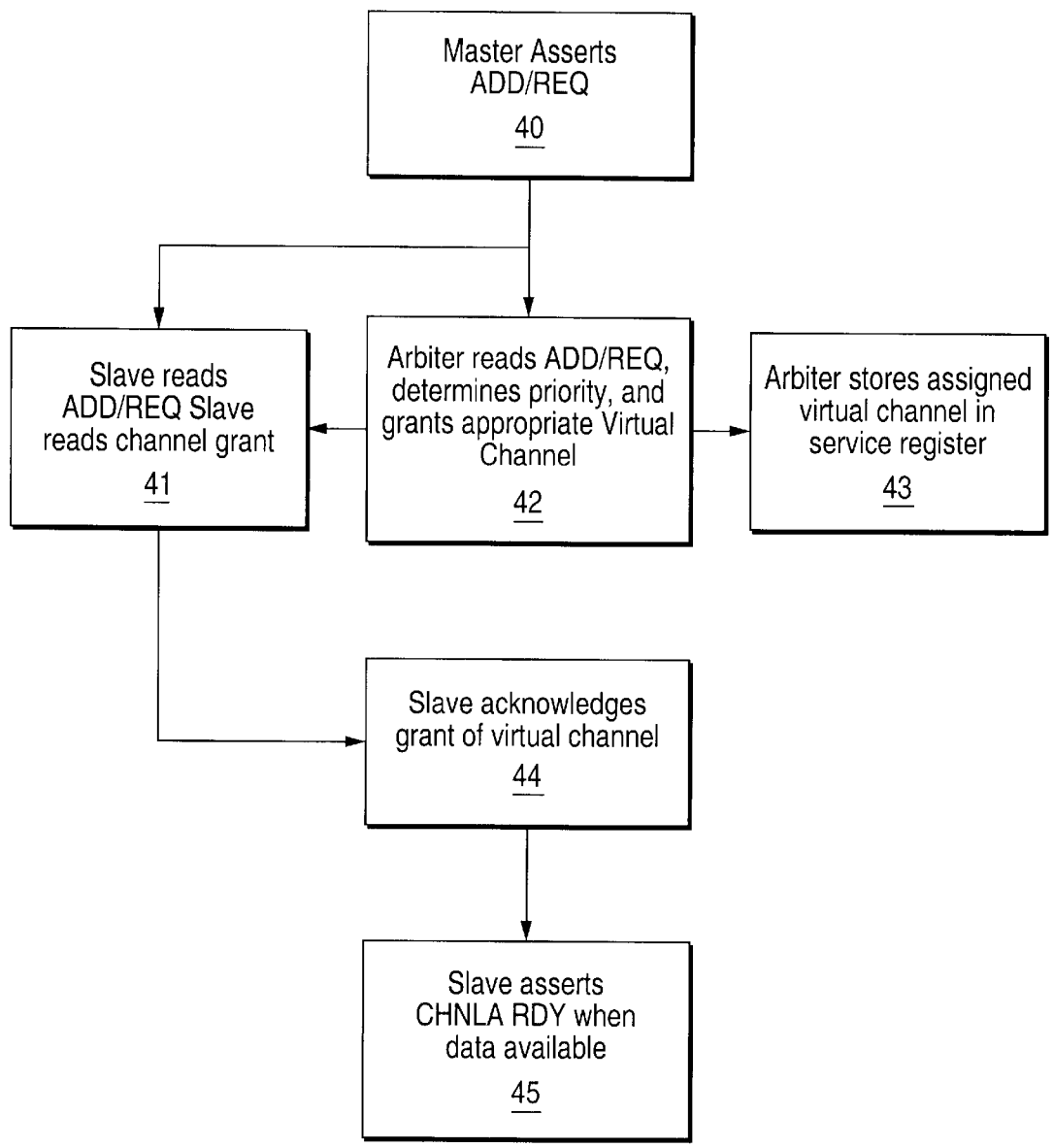
FIG. 5 is a flow diagram summarizing the virtual channel acquisition transactions, according to the present invention.

FIG. 5 illustrates the operation of system 1 of FIG. 1. At step 40, a master module (e.g., host CPU interface 5) initializes bus access by asserting address and bus request signals on the split-transaction bus 11. At steps 41 and 42, arbiter 4 and the slave module (e.g., memory subsystem 6) detect the address and request signals asserted by the master module. At a later phase of step 42, arbiter 4 identifies the master module making the request, determines the master module's priority, and grants a virtual channel. The virtual channel granted can be arbitrarily selected by an allocation procedure. Alternatively, each subsystem may be configured with a fixed virtual channel with a pre-assigned priority. Pre-designating virtual channels and priorities for each module simplifies processing by eliminating allocation procedures and requiring arbiter 4 to merely match the I/O address of the requesting master module to that master module's pre-assigned virtual channel and pre-assigned priority, referencing a table stored in a register of arbiter 4 or elsewhere. At step 43, the assignment of virtual channel is entered into an "in service" table.

At a later phase of step 41, arbiter 4's channel grant signal is detected by the slave module. At step 44, the slave module acknowledges the virtual channel grant. In step 45, the slave module asserts a channel ready signal to indicate that it is ready to read data from data bus 2 or to write data onto data bus 2.

Figure 6:
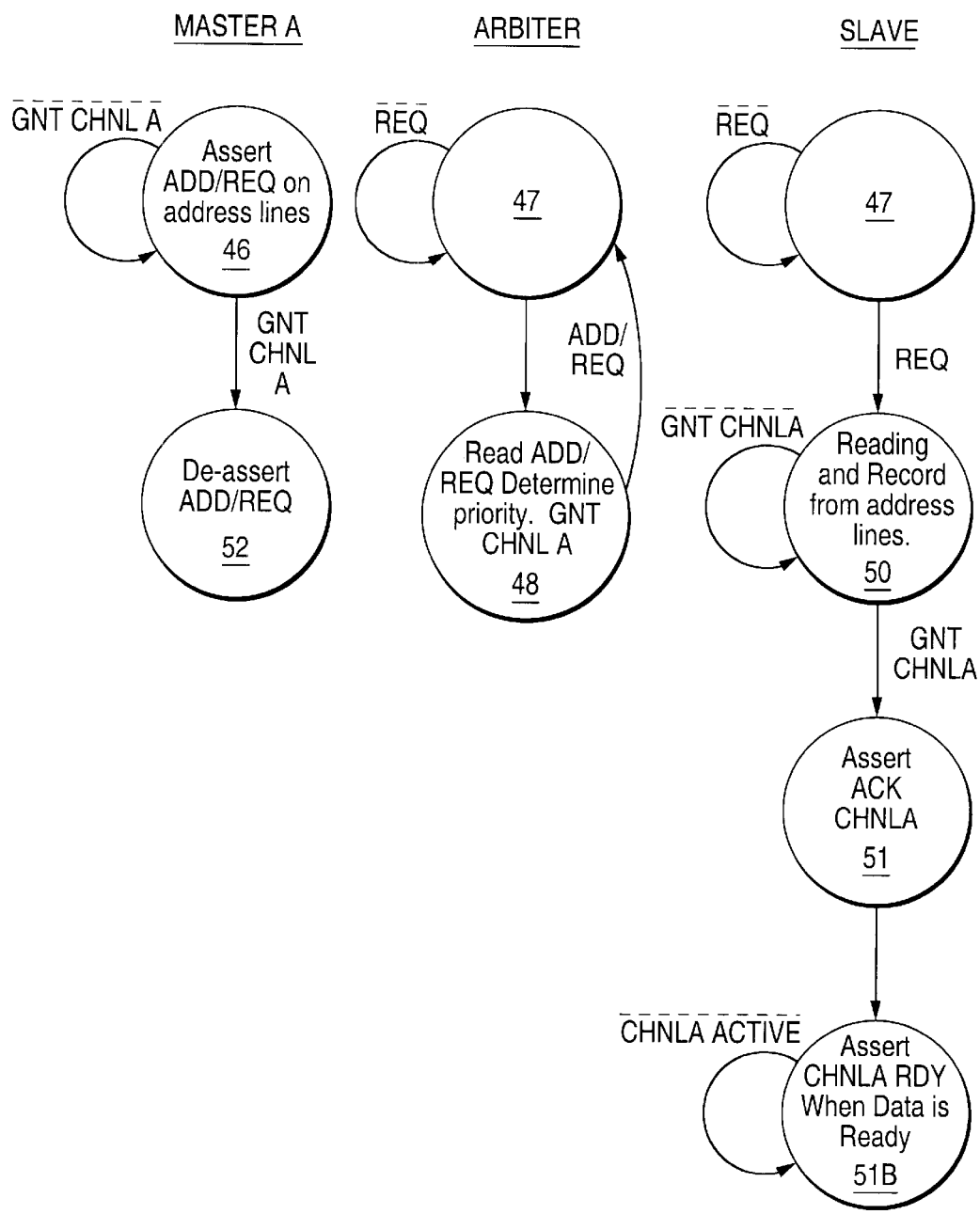
FIG. 6 is a state diagram of a bus arbiter, and exemplary master and slave modules in accordance with the present invention.

FIG. 6 shows a state diagram of the virtual channel assignment protocol generally described above in conjunction with FIG. 5. Initially (state 46), to request bus access, master module "A" asserts on address bus 3 an "ADD/REQ" signal on address bus 3, the address of the slave module, and the memory address of the data to be transferred. Master module A remains in state 46 until signal GNT CHNLA (grant channel A) is asserted by arbiter 4, whereupon master module A transitions to state 52 to deassert the ADD/REQ signal. If the virtual channel is not preassigned to master module A, the master channel latches the identity of the assigned virtual channel into register 14 of its bus interface logic layer 12.

From initial state 47, arbiter 4 transitions to state 48 upon detecting master module A's assertion of the ADD/REQ signal, and asserts signal GNT CHNLA on address bus 3 to indicate assignment of a virtual channel ("virtual channel A") to master module A, according to either master module A's preassigned virtual channel and priority, or according to an allocation procedure, as discussed above. After asserting signal GNT CHNLA, arbiter 4 returns to its initial state 47 to wait for the next ADD/REQ signal.

The slave module transitions from initial state 49 to state 50, upon recognizing its address from bus access request of master module A. At state 50, the address of the requested data is latched from address bus 3 into the slave module. Upon arbiter 4 asserting signal GNT CHNLA on the address bus 3, the slave module transitions from state 50 to state 51 and asserts signal ACK CHNLA to acknowledge virtual channel A's assignment, upon latching the identity of the assigned virtual channel into register 14 of its logic layer 12. The slave module transitions to state 51B and asserts signal CHNLA RDY when it is ready to read data from data bus 3, or write data on data bus 3. The slave module waits in state 51B until arbiter 4 grants data bus 3 to the virtual channel A by asserting CHNLA ACTIVE.

All concurrent virtual channel owners wait for an access grant by arbiter 4 to data bus 2. Access to data bus 3 to a particular virtual channel occurs when arbiter 4 asserts the virtual channel's active signal (e.g., CHNLA ACTIVE). Unlike prior art split transaction buses, transfer of possession of the data bus to a master/slave pair using the method of this invention advantageously does not require additional "handshaking" (i.e., address transfer protocols) between the master and the slave.

Figure 7:
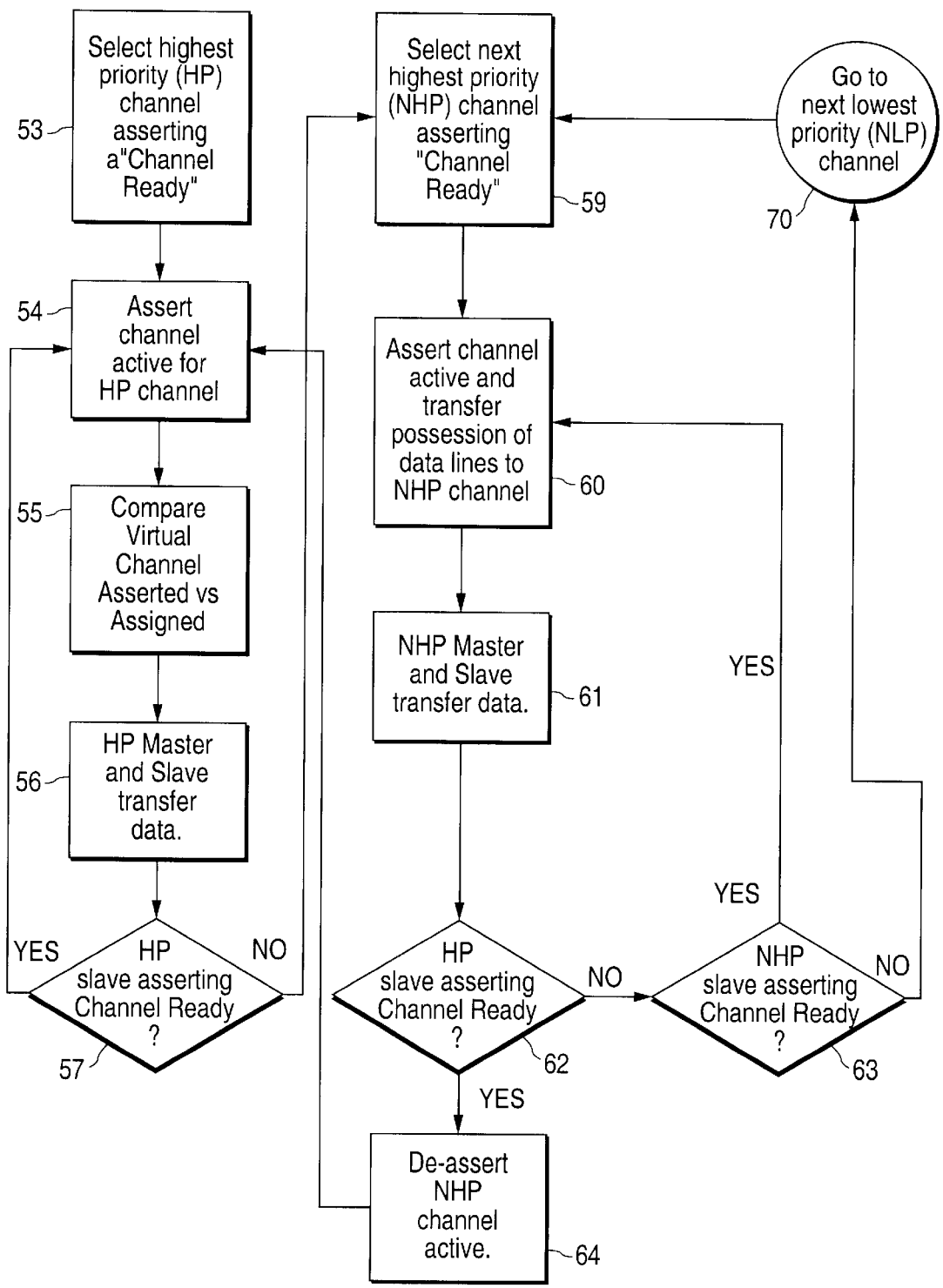
FIG. 7 is a flow diagram of a data transfer protocol associated with a preemptive priority access scheme, in accordance with the present invention.

FIG. 7 is a flow chart illustrating the method for granting a virtual channel to data bus 3. As shown in FIG. 7, at step 53 arbiter 4 references its in-service register to select among the currently granted virtual channels the one that has the highest priority. At step 54, arbiter 4 asserts a "channel active" signal associated (e.g. signal CHNLA ACTIVE) with the selected virtual channel ("HP channel"). At step 55, the master module and the slave module associated with the HP virtual channel recognizes the "channel active" signal for their virtual channel. At step 56, data is transferred onto data bus 3. Data can be transferred in burst mode, for example, to more fully utilize the available bandwidth of data bus 3.

At step 57, arbiter 4 samples the "channel ready" signal. Arbiter 4 maintains the "channel active" signal as long as the HP channel remains the highest priority active channel. A latency may occur when the I/O data source accesses a slower memory storage device, such as magnetic disk, RAM, optical disk, or must wait until more data becomes is received from an external data source, such as a modem. During the latency period, data transfer is temporarily halted, and the slave module deasserts the "channel ready" signal associated with the HP channel to indicate that the HP channel can be preempted. Upon detecting the "channel ready" signal being deasserted, at step 59, arbiter 4 selects from among the granted virtual channels with an asserted "channel ready" signal the virtual channel of the next highest priority ("NHP channel"). At step 60, arbiter 4 asserts the "channel active" signal associated with the NHP channel to grant NHP channel access to data bus 2. The master and slave modules of the NHP channel begin data transfer on data bus 2 at step 61.

At step 62, while data bus 2 is under the NPH channel's control, arbiter 4 polls the "channel ready" signal of the HP channel to determine if control of data bus 2 is to be returned. At step 64, upon detecting that the "channel ready" signal of the HP channel is reasserted, arbiter 4 deasserts the "active channel" signal associated with the NHP channel and reasserts the "channel active" signal associated with the HP channel. Data transfer by the HP channel can then resume, without the re-acquisition or re-arbitration protocols typical of prior art split transaction buses. Data transfer between the master and slave modules of the HP channel resumes according to the state information in their bus interface circuits (i.e., counter 115, and registers 21, 22, and 23).

A virtual channel is relinquished by the master module upon completion of the data transfer for which the virtual channel was requested. Arbiter 4 then removes the virtual channel from its list of granted virtual channels, thus allowing it to be reassigned to anther master/slave pair requesting data bus access. Alternatively, if a dynamic priority allocation scheme is used, the virtual channel's priority is reduced. Under one such scheme, the virtual channel is not taken away from its master and slave modules, unless a new virtual channel request is received by arbiter 4, and all virtual channels are granted.

The method for preemption illustrated by FIG. 7 can be extended to a large number of virtual channels with more than two levels of priority. Under that method, if arbiter 4 detects at step 63 deasserted "channel ready" signals, arbiter 4 can grant data bus 2 by asserting a "channel active" signal associated with the virtual channel of an even lower priority.

Figure 8:
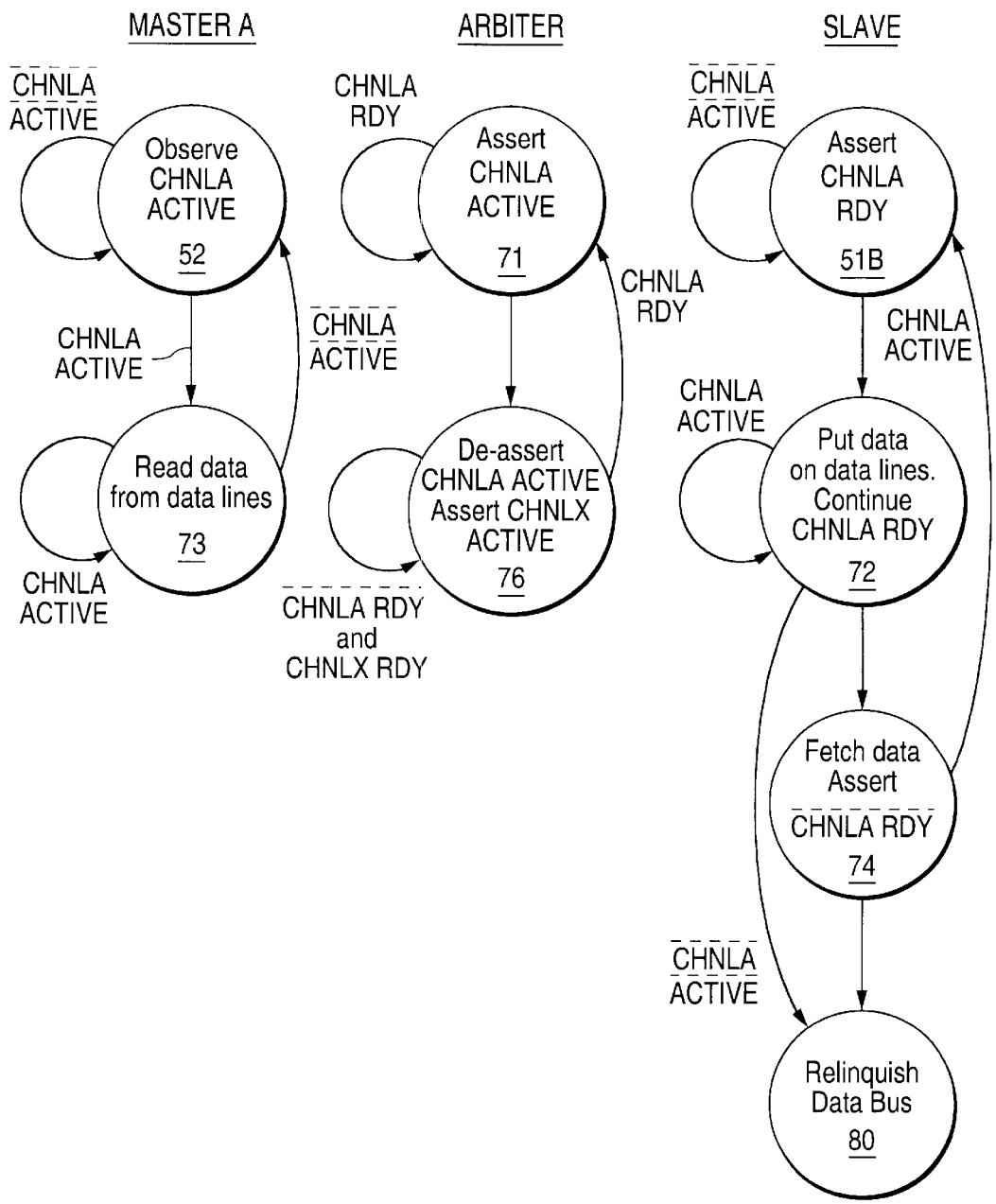
FIG. 8 is a state diagram of the bus arbiter, and a master/slave pair during the data transfer transactions of a virtual channel, according to the present invention.

FIG. 8 is a state diagram showing in further detail the data bus grant protocols generally described above with respect to FIG. 7. Initially, after virtual channel A is granted (FIG. 6), slave module A asserts signal "CHNLA RDY" (state 51B), as discussed above. As shown in FIG. 8, master module A of virtual channel A waits in state 52 for arbiter 4 to assert "CHNLA ACTIVE" to grant it data bus 2. At state 71, arbiter 4 samples "CHNLA RDY" for virtual channel A, and asserts CHNLA ACTIVE on address bus 3. Upon detecting CHNLA ACTIVE, slave module A transitions from state 51B into state 72 and master module A transitions from state 52 to state 73 to begin data transfer.

When the slave module waits for data to be available for transfer on data bus 2, slave module A de-asserts signal CHNLA RDY and waits in state 74. Arbiter 4 then deasserts "CHNLA ACTIVE" to temporarily regain control of data bus 3, and transitions to state 76. Master module A then returns to state 75 to wait for arbiter 4 to reassert signal CHNLA ACTIVE.

In state 76, when another granted virtual channel of a lower priority (represented in FIG. 8 as "CHNLX", or "virtual channel X") has its "channel ready" signal (CHNLX RDY) asserted, arbiter 4 asserts virtual channel X's "channel active" signal "CHNLX ACTIVE" to grant virtual channel X data bus 2. When slave module A completes its wait period, e.g., data arrives from an external data source, slave module A returns to state 51B and asserts CHNLA RDY. Upon detecting signal CHNLA RDY, arbiter 4 deasserts CHLNX ACTIVE and returns to state 71, asserting signal CHNLA ACTIVE to return control of data bus 2 to virtual channel A. Master module A then transitions to state 73 and slave module A transitions to state 72 to continue the interrupted data transfer. Thus, under this scheme, virtual channel A reacquires data bus 2 without additional reacquisition protocol. When data transfer is complete, slave module A enters state 80, de-asserting signal CHNLA RDY and relinquishing data bus 2 by asserting a "relinquishing" signal. Upon receiving the "relinquishing" signal, arbiter 4 removes virtual channel A from the list granted virtual channels it maintains. (Alternatively, arbiter 4 can lower virtual channel A's priority, if a priority allocation scheme is used, as discussed above.) A separate relinquishing signal may not be necessary if virtual channels, once granted, are not reassigned.

Figure 9A:
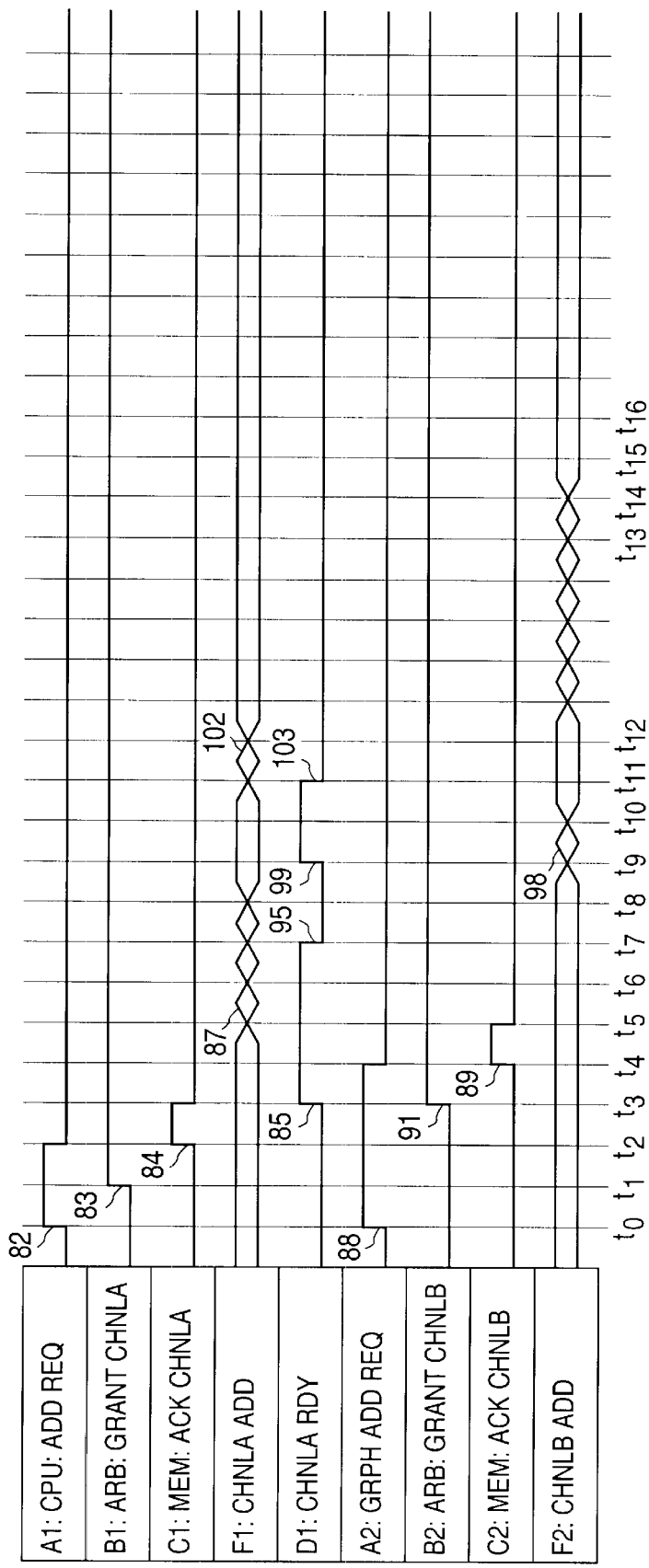
FIG. 9 is a timing diagram summarizing concurrent transactions of three virtual channels of the present invention.
Figure 9B:
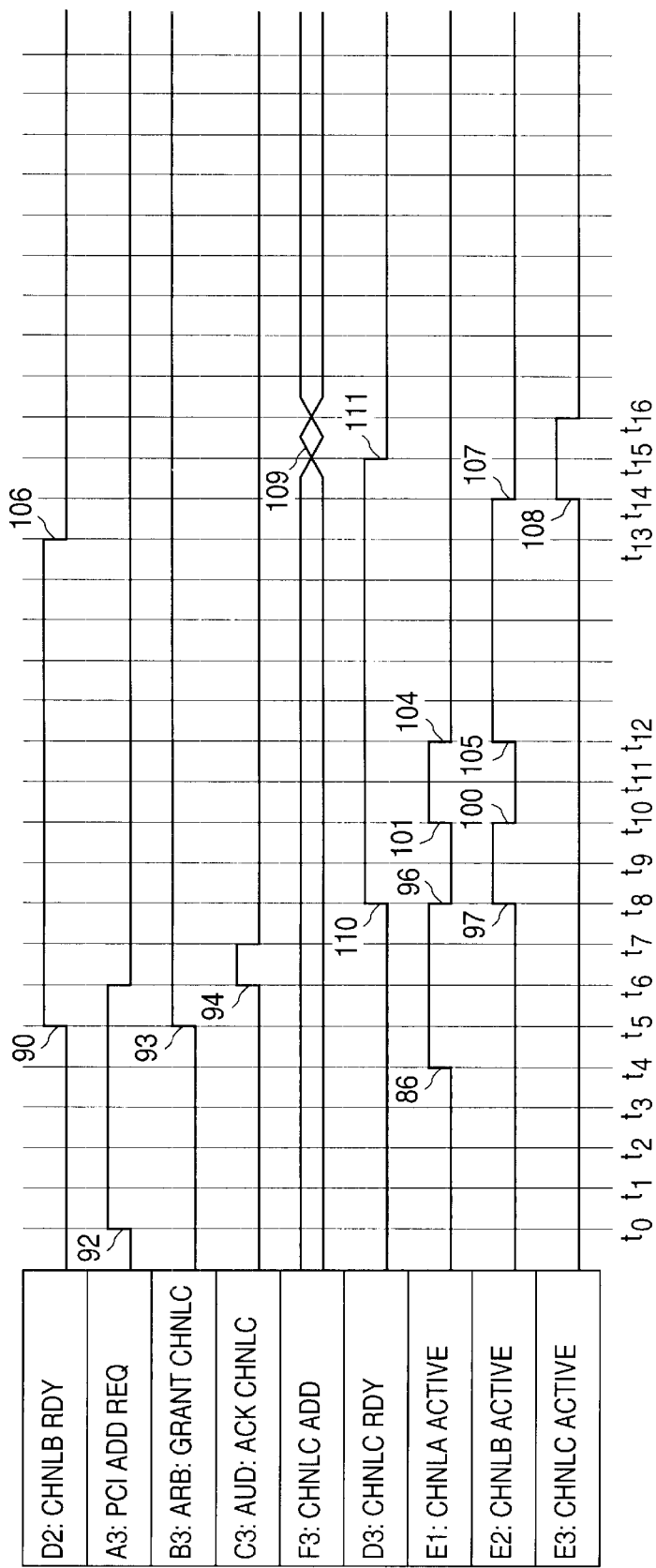

FIG. 9 is a timing diagram illustrating one instance of the operation of virtual channel split-transaction system 1 of the present invention. In FIG. 9, three functional modules CPU, PCI and GRPH, representing respectively CPU interface controller 5, PCI bus controller 7, and graphics controller 8, simultaneously (at time to) requesting access to data bus 2, asserting their respective request signals, as indicated by waveform events 82, 88 and 92. CPU interface controller 5 and graphics controller 8 both designates memory subsystem 6 as their respective slave module in their requests, while PCI bus controller 7 designates audio subsystem 9 as its slave module.

In this embodiment, CPU interface controller 5 has priority over PCI controller 7, which has priority over graphics controller 8. Thus, arbiter 4 thus grants virtual channels A, B and C of descending priorities to CPU interface controller 5, PCI controller 7 and graphics controller 8 by asserting signals GNT CHLNA, signal GNT CHLNB, and GNT CHLNC at times $t_1$, $t_3$ and $t_5$, as indicated by waveform events 83, 91 and 93, respectively. Memory unit 6, being the target slave module of both CPU interface controller 5 and PCI controller 7, acknowledges assignment of virtual channels A and B by asserting signals ACK CHLNA and ACK CHLNB at times $t_2$ and $t_4$, as indicated by waveform events 84 and 89, respectively. Similarly, audio subsystem 9 acknowledges assignment of virtual channel C by asserting ACK CHLNC at time $t_6$, as indicated by waveform event 94.

At times $t_3$ and $t_5$, memory module 6 asserts signal CHNLA RDY and signal CHNLB RDY to signal readiness for data transfer in virtual channels A and B, as indicated by waveform events 85 and 90, respectively.

In response to signal CHLNA RDY, arbiter 4 grants data bus 2 to virtual channel A by asserting CHLNA ACTIVE at time $t_4$, as indicated by waveform event 86. Data transfer between CPU interface controller 5 and memory subsystem 6 (e.g., by burst mode), is indicated by waveform event 87 at time $t_5$.

Memory subsystem 6 de-asserts CHNLA RDY at time $t_7$, as indicated by waveform event 95. In response, since audio subsystem 9 has already asserted signal CHNLB RDY at time $t_5$ (waveform event 90), arbiter 4 deasserts signal CHLNA ACTIVE (waveform event 96) and asserts signal CHNLB ACTIVE (waveform event 97) at time $t_8$, to grant data bus 2 to virtual channel B. Note that audio subsystem 9 has not asserted CHNLC RDY until time $t_8$ (waveform event 110), arbiter 4's only choice for transfer of control prior to time $t_8$ is to virtual channel B. Thus, data transfer becomes active in virtual channel B at time $t_9$ (waveform event 98).

Memory subsystem 6 reasserts signal CHLNA RDY at time $t_9$ (waveform event 99), and since CPU interface controller 5 has priority over both graphics controller 8 and PCI controller 7, arbiter 4 grants data bus 2 to CPU interface controller 5 by asserting signal CHNLA ACTIVE and deasserting signal CHNLB ACTIVE at time $t_{10}$ (waveform events 101 and 100), respectively. Virtual channel A resumes and completes data transfer at time $t_{11}$, and relinquishes data bus at time $t_{11}$ (waveform event 103) by deasserting signal CHNLNA RDY. Thus, at time $t_{12}$, since graphics controller 8 has priority over PCI controller 7, arbiter 4 grants data bus 2 to virtual channel B, asserting signal CHNLB ACTIVE and deasserting signal CHNLA ACTIVE.

At time $t_{13}$, virtual channel B completes its data transfer and relinquishes data bus 2, deasserting signal CHNLB RDY (waveform event 106). Consequently, at time $t_{14}$, arbiter 4 grants data bus 2 to virtual channel C at time $t_{14}$, asserting signal CHNLC ACTIVE and deasserting signal CHNLB ACTIVE. Data transfer in virtual channel C thus begins and completes at time $t_{16}$ (waveform events 109 and 111).

Since each split-transaction bus interface is provided its own memory address counter 115, the state of each data transfer in progress is maintained by both master module and the slave module, even when the data transfer is interrupted. Accordingly, data transfer can resume without further protocol transactions, when access to data bus 2 is granted.

The detailed description above is provided to illustrate specific embodiments of the present invention. The present invention is not limited by the specific embodiments. Numerous modification and variations within the scope of the present invention are possible. The present invention is set forth below in the claims.

I claim:

1. A computer system including a shared bus, said shared bus including a control portion and a data portion, said system comprising:
   an arbiter for assigning a plurality of virtual channels and for granting access to said data portion of said shared bus to one of said virtual channels; and
   a plurality of functional modules each including:
   i) an interface circuit for reading from and writing to said shared bus;
   ii) a memory address counter for tracking data transfer progress on said data portion of shared bus; and iii) a register for storing control information relating to a virtual channel.

2. A computer as in claim 1 wherein said arbiter assigns each of said virtual channels a priority based on which said arbiter grants access to said data portion of said shared bus.

3. A computer system as in claim 2 wherein said priority scheme is preemptive priority.

4. A computer system as in claim 3 wherein said priority is fixed.

5. A computer system as in claim 3, wherein said priority is dynamically allocated.

6. A computer system as in claim 1 further comprising a plurality of buffers to be associated with said virtual channels for prefetching data from said memory.

7. A computer system as in claim 1, wherein, when one of said functional modules requests one of said virtual channel for communicating with a targeted one of said functional modules, said arbiter assigns a virtual channel to said requesting functional module and said targeted functional module.

8. A computer system as in claim 7, wherein, when said requesting and targeted functional modules are ready for data transfer, one of said requesting and targeted functional modules asserts a data ready signal associated with said assigned virtual channel.

9. A computer system as in claim 8, wherein said arbiter grants access to said data portion of said shared bus upon detecting said data ready signal and upon determining that said data portion of said shared bus is available.

10. A method for transferring data between functional modules in a modularized computer system having a plurality of functional modules, and a shared bus, said shared bus having a control portion and a data portion, said method comprising the steps of:
   a) assigning a virtual channel to a selected pair of said functional modules;
   b) storing control information of said virtual channel in each module of selected pair of said functional modules;
   c) granting access to said data portion of said bus by said assigned virtual channel, when one of said selected pair of said functional modules asserts a data ready signal associated with said assigned virtual channel and when said data portion of said bus is available; and
   d) tracking data transfer progress using address registers in each module of said selected pair of said functional modules.

11. A method as in claim 10, further comprising the steps of:
   a) providing a priority scheme among virtual channels;
   b) granting access to said data portion of said shared bus to a first virtual channel in accordance with said priority scheme;
   c) monitoring data transfer in said first virtual channel, wherein when said first virtual channel becomes idle, granting access to said data portion of said shared bus to a second virtual channel having a priority less than said first virtual channel; and
   d) granting access to said data portion of said shared bus to said first virtual channel when said first virtual channel ceases to be idle.

12. A method as in claim 11, further comprising the steps of:
   a) providing a plurality of buffers in a memory subsystem;
   b) assigning a buffer to each of said first and said second virtual channels; and
   c) fetching data from said memory subsystem into each of said assigned buffers for placing on said data portion of said shared bus whenever the associated one of said first and second virtual channels is granted access to said data portion of said shared bus.

* * * * *